March 24, 1964  K. MAIERSHOFER  3,125,820
SLIDE TRAY INDEXING ARRANGEMENT
Filed July 17, 1961
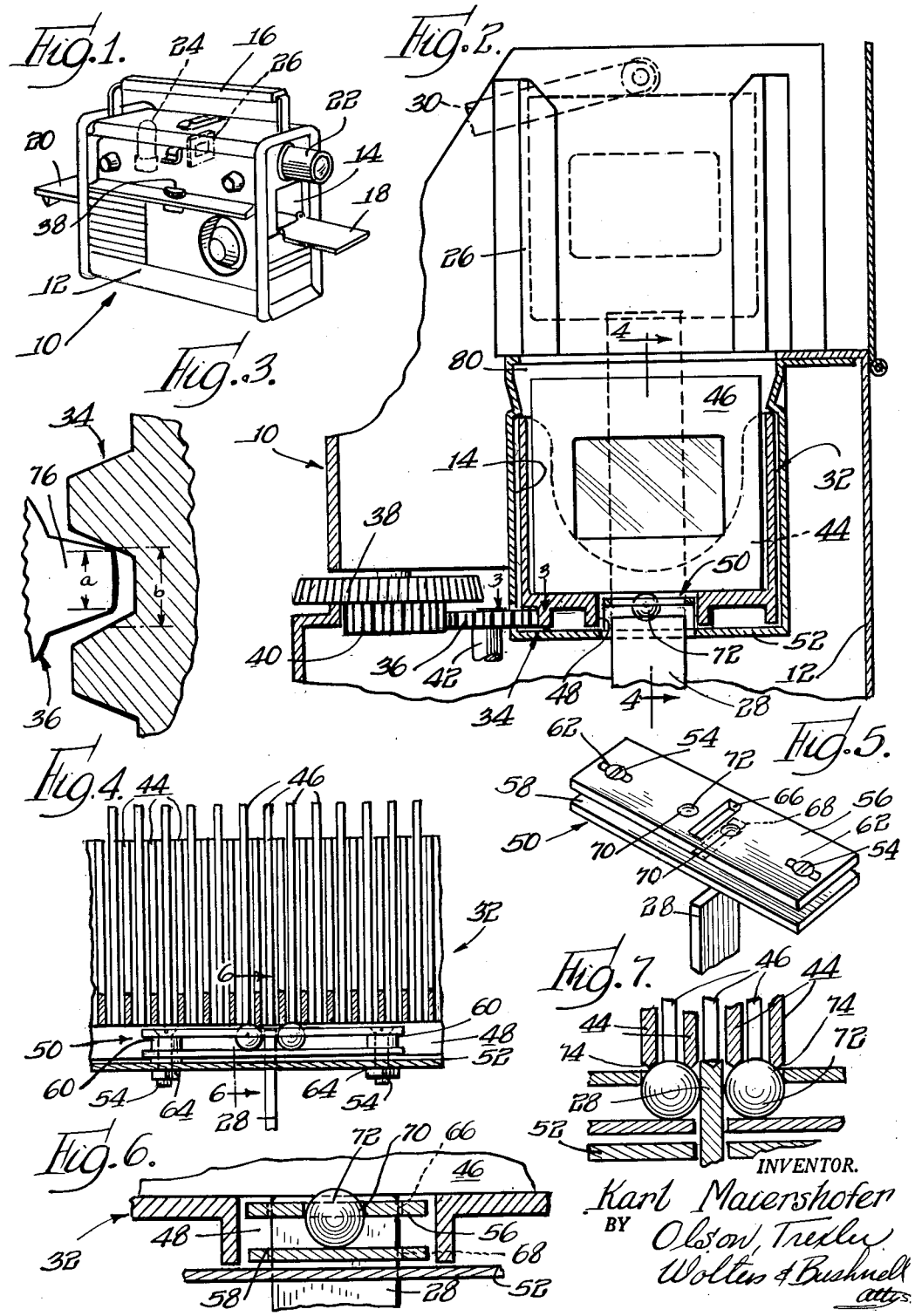
INVENTOR.
Karl Maiershofer
BY Olson, Trexler
Wolters & Bushnell
attys.

United States Patent Office 3,125,820
Patented Mar. 24, 1964

3,125,820
SLIDE TRAY INDEXING ARRANGEMENT
Karl Maiershofer, Park Ridge, Ill., assignor to G-M Laboratories Inc., Chicago, Ill., a corporation of Illinois
Filed July 17, 1961, Ser. No. 124,472
5 Claims. (Cl. 40—79)

This invention relates generally to projection apparatus for photographic slide transparencies and more particularly to arrangements for positioning a slide-carrying tray in a slide projector.

According to conventional practice, trays are provided for transporting a group of photographic slide transparencies through a slide projector; and these trays are ordinarily divided into an appropriate number of stalls by parallel spaced-apart partitions. The trays are also fashioned with an exteriorly exposed rack, and a pinion gear in the projector meshes with this rack to index the tray for sequential showing of the slides. The rack and pinion gear are relied on not only to move the tray incrementally through the projector but also to position each of the stalls for ejection and return of the slide borne therein for its showing.

The slide trays are customarily fabricated in a plastics molding operation; and because of the great numbers that are produced annually, a variety of commercial sources are necessarily involved. Molding die variations from source to source as well as warpage arising during production have been found to cause off-registry of the teeth of the rack and the stall-defining partitions. Improper positioning of the tray and obstruction or jamming of the slide changer mechanism can result. Furthermore, loose meshing between the pinion and the rack, as might arise from wear of either part or from eccentricity of the gear, has been found to result in similar difficulties.

Therefore, an important object of the present invention is to provide a slide tray indexing arrangement that overcomes the limitations of the prior art by positioning the tray using the stall-defining partitions instead of the tray-feeding rack.

A more general object of the invention is to provide a new and improved photographic slide projection apparatus.

Another object of the invention is to provide photographic slide projection apparatus which is characterized by accurate, reliable positioning of the slide stalls relative to the changer mechanism.

And another object of the invention is to provide a device for positioning a slide tray which directly positions the slide stalls and simultaneously guides the pusher arm of the changer mechanism into a stall.

Additional objects and features of the invention pertain to the particular structure and arrangements whereby the above objects are attained.

Apparatus in accord with the invention includes a structure defining a slide tray tunnel; a slide tray slidably receivable in the tunnel and including a plurality of partitions disposed in parallel, spaced-apart relationship defining individual slide stalls; means for feeding the tray incrementally through the tunnel; and a pair of spaced-apart members, each defining a curved surface for contacting adjacent partitions of the slide tray for releasably positioning the tray in the tunnel.

The invention, both to its structure and mode of operation, will be better understood by reference to the following disclosure and drawing forming a part thereof, wherein:

FIG. 1 is a perspective view of a photographic slide projector constructed in accordance with the principles of the invention;

FIG. 2 is an enlarged central cross-sectional view of the projector of FIG. 1, showing the slide tray tunnel and related elements;

FIG. 3 is an enlarged view taken through the section 3—3 of FIG. 2;

FIG. 4 is a view taken through the section 4—4 of FIG. 2;

FIG. 5 is a perspective view of the tray-positioning device of the invention;

FIG. 6 is an enlarged view taken along the section 6—6 of FIG. 4; and

FIG. 7 is a view similar to FIG. 4 but enlarged to reveal details of the tray positioning device.

Referring now in detail to the drawing, specifically to FIG. 1, a photographic slide projector indicated generally by the numeral 10 will be seen to include a housing structure 12 having a slide tray tunnel 14 and a carrying handle 16. A front door 18 and a back door 20 are hinged to the housing structure 12 to close off the tray tunnel 14 for storage or transportation of the unit. An adjustable, projection lens assembly 22 is situated at the front end of housing structure 12 in optical alignment with a projection lamp 24. Intermediate the lens assembly 22 and the lamp 24 is a slide frame 26; and slides are ejected from trays situated in the tunnel 14 into the frame 26 for projection by means of a changer mechanism including a pusher arm member 28 shown in FIG. 2. Pusher arm 28 passes freely through a slot fashioned in the floor of the tray tunnel 14.

Continuing with reference to FIG. 2, a backup member 30 cooperates with pusher arm 28 in returning individual photographic slide transparencies from the frame 26 to a slide tray indicated generally at 32. The slide tray 32 is fashioned with an integral, straight rack 34 extending longitudinally along a lower edge thereof exposed for meshable contact with a pinion gear 36. A manual control knob 38 partially extends through the housing structure 12 and is fixed to a spur gear 40 meshing with the pinion 36. Manual rotation of the knob 38 causes rotation of the pinion 36 and incremental movement of the slide tray 32 through the tunnel 14. As will be recognized, the pinion 36 may also be driven from a motor, not shown, through a shaft 42, such automatic driving of the pinion 36 being advantageously coordinated with the operation of pusher arm 28.

Considering FIGS. 2 and 4, the slide tray 32 will be seen divided into a number of individual slide stalls by a suitable number of parallel spaced-apart partitions 44, each formed in a general U-shape as is best shown in FIG. 2. The stalls defined by the partitions 44 are each adapted to receive and carry a photographic slide transparency 46; and the tray 32 is advantageously provided with a longitudinal groove 48 extending along the center of the bottom thereof exposing the lower edges of both the partitions 44 and the slides 46, slides 46 being exposed for ejection from the tray by the action of pusher arm 28 and the edges of the partitions 44 being exposed for purposes which will become apparent hereinafter.

In accordance with an important feature of the invention, a tray-positioning device indicated generally by the numeral 50 in FIG. 5 is mounted to the floor 52 of tray tunnel 14 by means of screws 54. The tray-positioning device 50 includes an upper plate 56 and a lower plate 58 which are spaced-apart by tubular elements 60 shown in FIG. 4, the screws 54 passing through longitudinal slots 62 fashioned in the plates 56 and 58 and through the bores of spacers 60. The screws 54 additionally pass through circular apertures formed in the floor 52 so that nuts 64 can be threadedly secured to their lower ends. The slots 62 are elongated in a direction parallel to the longitudinal axis of the tray tunnel 14 for ease in positioning the device 50 relative to the pinion 36 and the pusher arm 28.

The plates 56 and 58 are fashioned with transverse, pusher-arm-passing slots 66 and 68 respectively; and these slots are aligned vertically for passing the pusher arm 28 into transportable contact with a slide 46. Spaced-apart along the longitudinal axis of plate 56 are a pair of circular apertures 70. Into each of the apertures 70 a spherical element or ball 72 is placed, each of the balls 72 resting on the lower plate 58 and extending its curved surface a small distance above the upper surface of the plate 56.

As is well shown in FIG. 7, the balls 72 are situated with their centers spaced apart by double the pitch or distance between the central planes of the partitions 44. The balls 72 furthermore contact bevelled edges 74 of adjacently disposed partitions 44. One of the balls, for example the left ball, catches the front end of an incoming tray for proper initial positioning thereof. Similarly, the other ball cooperates with the rear end of an outgoing tray for proper positioning thereof.

Disposition of the balls 72 on opposite sides of the pusher-arm-passing apertures gives rise to a second important feature of the invention. When the balls 72 are so positioned, suitable spacing and selection of the size of the balls permits them to guide the pusher arm 28 into the center of a stall with minimum tolerances.

Turning to FIG. 3, the pinion gear 36 will be seen fashioned with teeth 76 having a basic thickness or circular pitch "a." The rack 34 is correspondingly arranged with a tooth spacing having a basic thickness or chordal pitch "b." In accordance with the present invention, the basic thickness of a tooth 76 is of lesser dimension than the corresponding basic thickness of the tooth spacing of the rack 34. This arrangement insures exclusive positioning of the tray 32 by the balls 72 of device 50.

Advantageously, the tray tunnel 14 is provided with a clearance spacing 80, shown in FIG. 2, above the slide tray 32; and upon indexing of the tray 32 through the tunnel 14 by rotation of the pinion gear 36, a certain amount of vertical freedom will thus be afforded the tray 32 to permit the partitions 44 to ride over the positioning balls 72. A slight clearance generally is left at the bottom, since the tray preferably is supported by the balls. Alternatively, the clearance spacing 80 could be eliminated and the balls 72 spring biased toward the partitions, the bias of the spring or springs being overcome by the driving action of pinion 36 for depression of the balls and incremental stepping of the tray 32.

The manner in which the present invention may be practiced and the purposes to which it may be put will be evident from the foregoing description.

The specific example herein shown and described should be considered illustrative only. Various changes in structure may occur to those skilled in the art; and these changes are to be understood as forming a part of this invention insofar as they fall within the spirit and scope of the appended claims.

The invention is claimed as follows:

1. In photographic slide projection apparatus, the combination comprising: means defining a slide tray tunnel; slide tray means slidably receivable in said tunnel, including a plurality of partitions disposed in parallel spaced-apart relationship defining individual slide stalls; means for feeding said tray incrementally through said tunnel; pusher arm means arranged to be extended and retracted transversely of said tunnel for transporting a slide relative to a said stall and having a predetermined thickness longitudinally of said tunnel; and a pair of spaced rollers, each defining a curved surface for contacting adjacent partitions of said tray, so constructed and arranged as releasably to position said tray in said roller tunnel, said curved surfaces being further disposed on opposite sides of said pusher arm means and spaced apart substantially by said predetermined thickness whereby to guide said arm means into a said stall.

2. The combination according to claim 1 wherein said rollers comprise spherical elements.

3. The combination according to claim 1 wherein the bottom edges of said partitions are beveled to coact with said curved surfaces.

4. In photographic slide projection apparatus of the type having a tray passageway with a floor, a device for positioning a slide tray of the type having parallel, spaced-apart partitions with the bottom edges thereof exposed, said device comprising: structure means fixed relative to said floor and defining an aperture for passing a pusher arm member, said pusher arm member having a predetermined thickness longitudinally of said passageway; a plurality of rollable means retained by said structure means and extending into contact with the bottom edges of adjacent pairs of said partitions for releasably positioning said tray in said tunnel, two of said rollable means being positioned on opposite sides of said aperture and spaced substantially by said predetermined thickness for guidably contacting said pusher arm member.

5. In a photographic slide projection apparatus, the combination comprising: means defining a slide tray tunnel; slide tray means slidably received in said tunnel, including a plurality of partitions disposed in parallel spaced-apart relationship defining individual slide stalls; means for feeding said tray incrementally through said tunnel; pusher arm means arranged to be extended and retracted transversely of said tunnel for transporting a slide relative to a stall and having a predetermined thickness longitudinally of said tunnel; and a pair of roller means spaced longitudinally of said tunnel and disposed on opposite sides of said pusher arm means, said pair of spaced means being simultaneously engageable with the opposite sides of said pusher arm means and with adjacent partitions of said tray relatively to position said pusher arm means and said partitions, and thereby to guide said pusher arm means into a stall.

References Cited in the file of this patent

UNITED STATES PATENTS

| | | |
|---|---|---|
| 2,705,438 | Peto | Apr. 5, 1955 |
| 2,878,604 | Mulch | Mar. 24, 1959 |
| 3,000,258 | Misuraca | Sept. 19, 1961 |
| 3,025,760 | Jungjohann | Mar. 20, 1962 |

UNITED STATES PATENT OFFICE
CERTIFICATE OF CORRECTION

Patent No. 3,125,820 March 24, 1964

Karl Maiershofer

It is hereby certified that error appears in the above numbered patent requiring correction and that the said Letters Patent should read as corrected below.

Column 4, line 10, for "said roller tunnel, said curved" read -- said tunnel, said roller curved --.

Signed and sealed this 8th day of September 1964.

(SEAL)
Attest:

ERNEST W. SWIDER
Attesting Officer

EDWARD J. BRENNER
Commissioner of Patents